Figure 1:
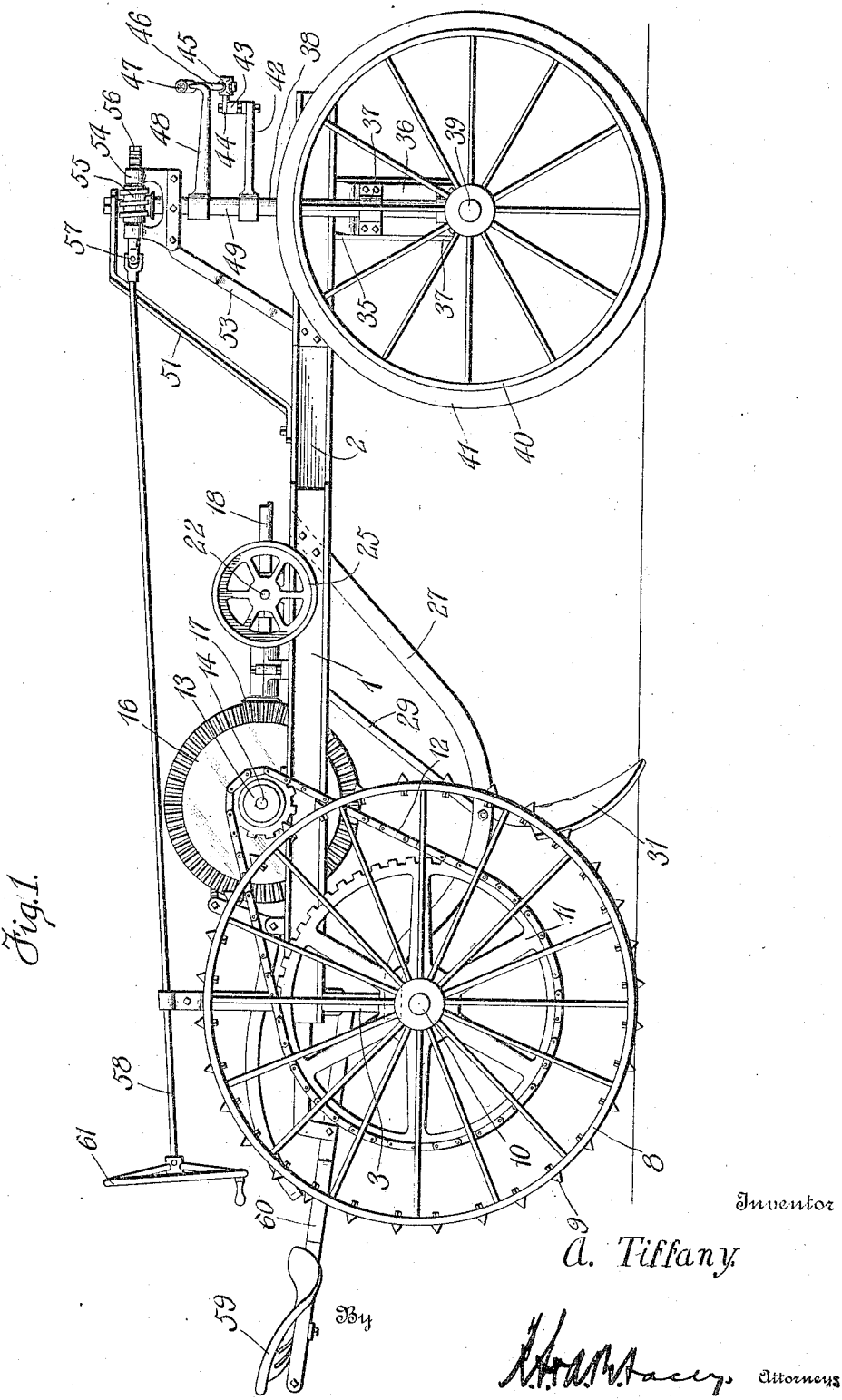

A. TIFFANY.
MOTOR CARRIAGE FOR AGRICULTURAL IMPLEMENTS.
APPLICATION FILED APR. 12, 1916.

1,237,975.

Patented Aug. 21, 1917.
4 SHEETS—SHEET 1.

Inventor
A. Tiffany,
By
Attorneys.

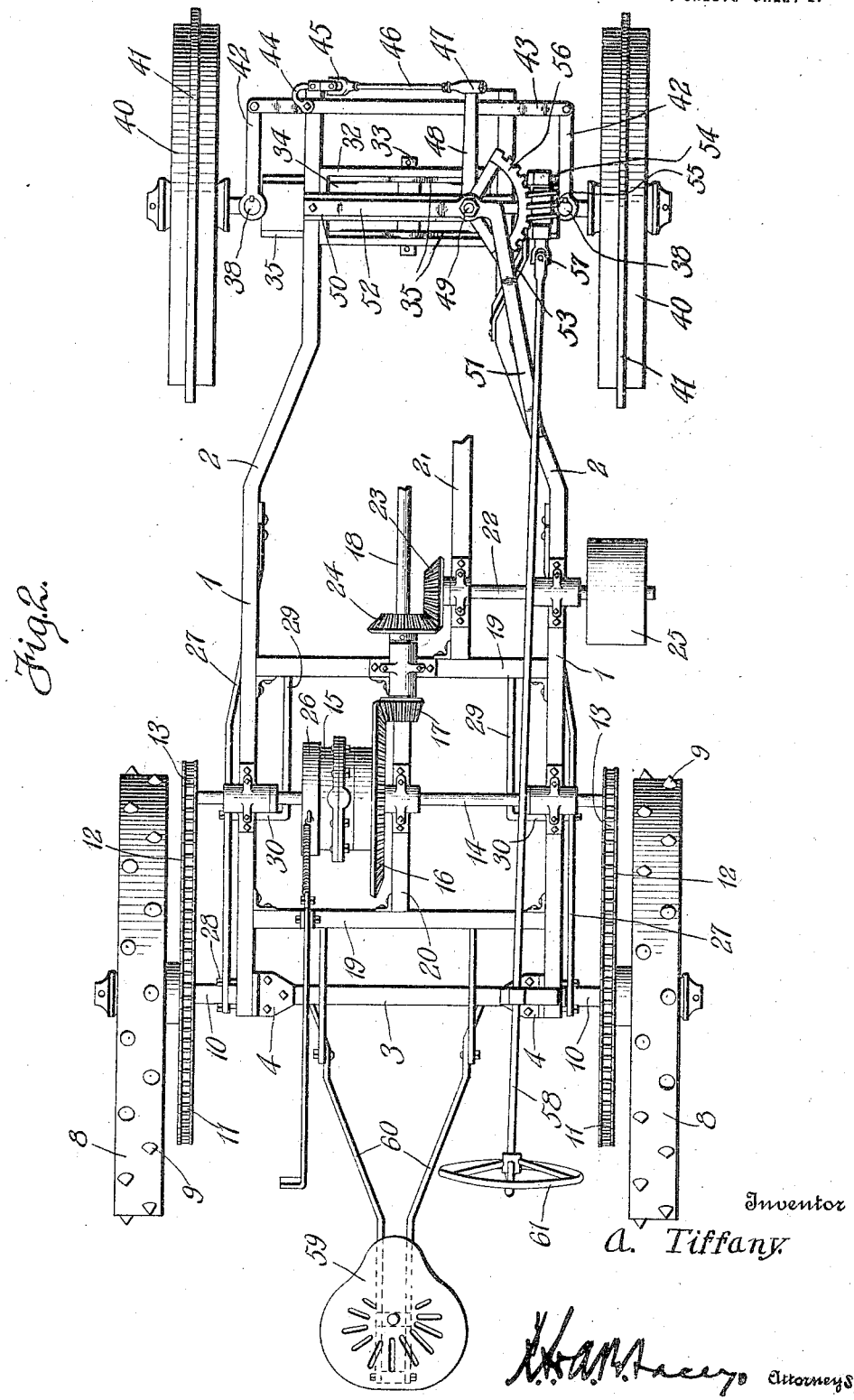

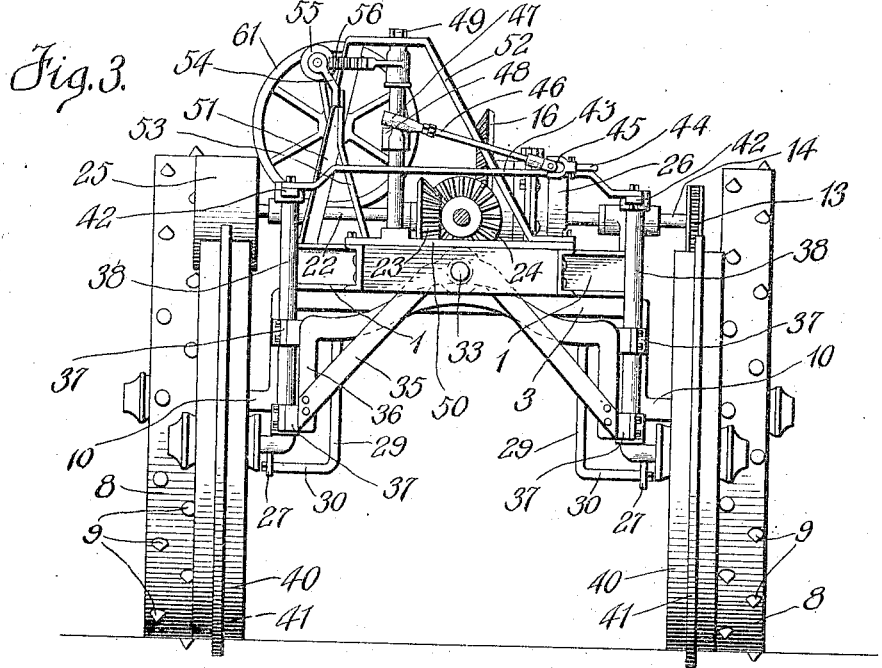
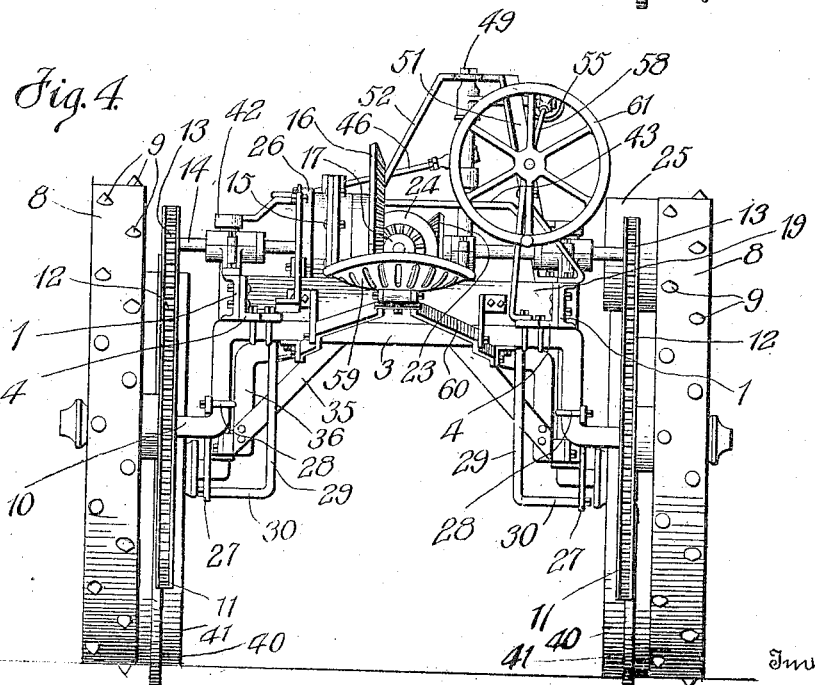

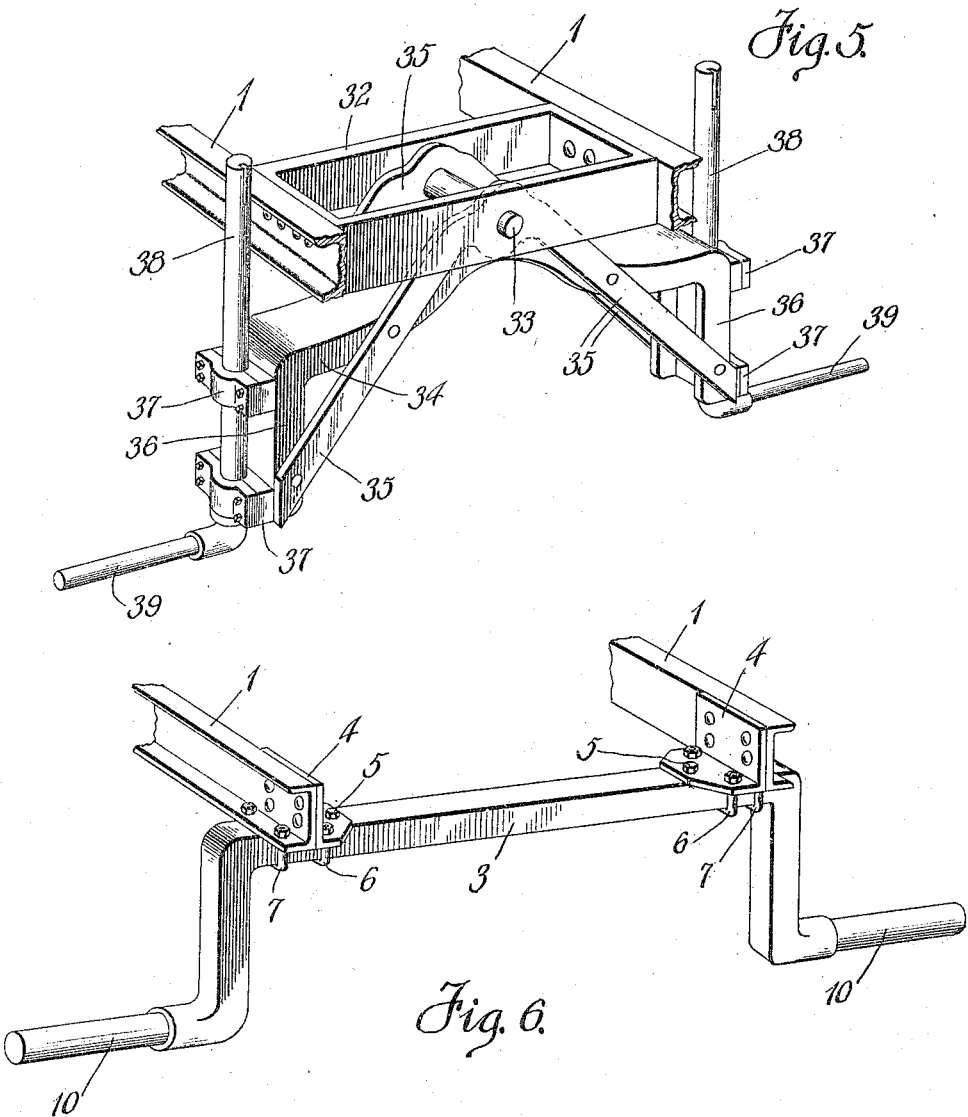

UNITED STATES PATENT OFFICE.

ADELBERT TIFFANY, OF SIOUX CITY, IOWA.

MOTOR-CARRIAGE FOR AGRICULTURAL IMPLEMENTS.

1,237,975. Specification of Letters Patent. Patented Aug. 21, 1917.

Application filed April 12, 1916. Serial No. 90,691.

*To all whom it may concern:*

Be it known that I, ADELBERT TIFFANY, a citizen of the United States, residing at Sioux City, in the county of Woodbury and State of Iowa, have invented certain new and useful Improvements in Motor-Carriages for Agricultural Implements, of which the following is a specification.

This invention relates to motor carriages for agricultural implements and has special reference to motor carriages or tractors of the type disclosed in Letters Patent No. 1,120,105, issued to me December 8, 1914.

One object of the present invention is to improve the steering mechanism of the tractor or motor carriage and to mount the platform or main frame upon the front axle in such manner that the steering wheels may move relative to each other in vertical planes so as to retain the platform or main frame in a level position notwithstanding irregularities in the surface of the ground or the meeting of obstructions or deep holes by one steering wheel while the other wheel remains upon the normal level. A further object of the invention is to improve the construction of the frame whereby the same will be strengthened and the rear axle firmly connected therewith.

Other and incidental objects of the invention will appear as the description of the same proceeds.

The invention is illustrated in the accompanying drawings in which—

Figure 1 is a side elevation of a motor carriage embodying my present improvements, the engine being omitted, Fig. 2 is a plan view of the same, Fig. 3 is a front end elevation, Fig. 4 is a rear end elevation, Fig. 5 is a detail perspective view showing the construction of the front axle and the manner of connecting the same to the main frame, Fig. 6 is a similar view showing the manner in which the rear axle is connected to the main frame.

In carrying out my invention, I employ a main frame consisting of channel bars 1 which are of suitable length and have their end portions parallel as clearly shown in Fig. 2, the intermediate portions of the said channel bars being inclined or converged forwardly, as shown at 2 so that the front end portion of the frame is somewhat narrower than the rear end portion thereof. The rear extremities of the side bars 1 rest upon the rear axle 3 and to the inner sides of the said bars are firmly secured brackets or angle plates 4 which have their lower flanges or members resting directly upon the axle and secured thereto by bolts 5 inserted through the same and clips 6 passing around the axle as clearly shown in Fig. 6. Clips 7 fitting around the axle and through the lower flanges of the side bars also aid in securing the frame rigidly to the rear axle which is of an arched construction as clearly shown in Figs. 4 and 6. The rear ground wheels 8, which may be provided with spurs 9 or similar ground engaging members, are mounted upon the outwardly extending spindles 10 of the rear axle and held thereon in any desired manner. To the inner ends of the hubs of the wheels 8 I rigidly secure sprocket wheels 11 around which are trained sprocket chains 12 which are also trained around pinions 13 on a transmission shaft 14 which is mounted in suitable bearings upon the side bars 1 as clearly shown in Figs. 1 and 2. This transmission shaft 14 will preferably be provided with a differential 15 and is also equipped with a beveled gear 16 which meshes with a beveled pinion 17 upon the rear end of the engine shaft 18 which is journaled in suitable bearings upon a cross bar 19 secured to and extending between the side bars 1. The engine may be of any well known type and forms no part of my present invention and is therefore omitted from the drawings for the sake of clearness. In order to guard against bending of the shaft 14, a longitudinal beam 20 is provided between the front and rear cross beams 19 as shown clearly in Fig. 1. Adjacent one side bar 1, is an intermediate longitudinal beam 21 and upon the same and the said side bar are bearings in which is journaled a shaft 22 having a beveled pinion 23 at its inner end meshing with the pinion 24 on the motor shaft 18 while a band pulley 25 is secured upon the outer end of said shaft 22. By this arrangement, I am enabled to transmit the power of the engine to any machinery to be driven while holding the carriage stationary, a brake drum 26 being provided upon the casing of the differential 15 to prevent travel of the carriage when it is desired to transmit the power to a threshing machine or other mechanism.

My device is intended more particularly for moving plows or cultivators over a field and to this end hangers or brackets 27 have their front ends secured to the side bars 1 at a point in advance of the rear axle and preferably, immediately adjacent the converging portions 2 of the side bars. These hangers or brackets consist essentially of metallic straps or bars extending downwardly and rearwardly from their front ends and then brought slightly upwardly to meet the vertical portions of the rear axle to which they are rigidly secured by suitable clips 28. Inner braces or hanger members 29 have their front ends secured to the forward cross beam 19 within the side bars and have their lower rear ends bent sharply outward to be secured to the lowest portion of the respectively adjacent hanger 27, thereby providing a support 30 for the cultivator or plow 31. Between the front portions of the side bars 1, I secure directly to the same a frame 32 consisting of end bars or plates secured rigidly to the inner sides of the side bars 1 and cross bars or plates extending between said end bars and preferably formed integral therewith. A cylindrical rod or pivot pin 33 is fitted in and extends between the front and rear cross bars or plates of this frame 32 at the center of the same and upon the said pin is hung an arched beam or truss 34 having arched braces 35 secured to its front and rear sides and extending upwardly from its lower extremities to enter the open frame 32 and pivotally fit upon the pin or rod 33. To the vertical end portions 36 of the arched truss 34, I secure bearings 37 in which are mounted the vertical spindles 38 of the front axles 39 upon which are mounted the steering wheels 40, the said steering wheels being preferably provided with annular flanges or ribs 41 which are adapted to enter the ground and thereby prevent skidding of the machine. To the upper ends of the spindles 38, I secure cranks 42 which project forwardly from the said spindles and are connected by a link 43, the ends of said link being pivoted to the forward extremities of the said cranks. Upon the said link or connecting bar 43 I pivotally mount a block 44 which is connected by a universal joint 45 with a pitman 46, said pitman being connected by a swivel or universal joint 47 with a crank 48 projecting forward from a vertically disposed steering shaft 49 which is mounted in suitable bearings upon a cross bar 50, secured upon the forward portion of the side bars 1, and in a bracket 51 rising from one of said side bars 1 and extending over to the upper end of the shaft 49. To guard against bending of the said shaft, an additional bracket 52 may be secured upon the beam 50 and extends upwardly therefrom to the upper end of the shaft, as will be readily understood. A bracket or standard 53 rises from the side bar 1 and carries a yoke 54 at its upper end, a worm shaft 55 being journaled in said yoke and meshing with a segmental gear 56 on the upper end of the steering shaft 49 as shown. The worm shaft 55 is connected by a universal joint 57 to the front end of a steering rod 58 which is mounted in suitable guides upon the main frame and extends rearwardly to a point where it may be conveniently manipulated from the seat 59 which is carried by supporting arms 60 projecting rearwardly from the rear axle and the rear cross bar 19. A hand wheel 61 is preferably provided upon the rear end of the steering rod 58 so as to facilitate the manipulation of the same.

It is thought the operation and advantages of my improved apparatus will be readily understood from the foregoing description taken in connection with the accompanying drawings. The cultivators or other agricultural implements are rigidly secured upon the supporting frames consisting of the hangers 27 and 29 and the machine is driven over the field in the usual manner of a traction engine, the power of the motor, which is preferably an internal combustion engine, being transmitted through the described gearing to the sprocket wheels 11 and thence applied to the traction wheels 8 so as to propel the machine. The machine is steered by manipulating the steering rod 58 as will be readily understood, rotation of said rod being transmitted through the worm shaft 55 and the segmental gear 56 to the steering shaft 49 so that the crank 48 will be caused to swing toward one or the other side of the machine. The movement of the crank 48 will be transmitted directly to the pitman 46 and thereby applied to the connecting bar 43 so that the cranks 42 will follow the movement of the crank 48 and thereby turn the front axles in a horizontal plane without disturbing the parallelism of the steering wheels. The machine can thus be steered to one or the other side within a small compass and may be readily made to turn a corner or brought into position for a return trip over the field being cultivated. It will be readily noted that inasmuch as the front axle is pivotally hung at its top and in its central vertical plane and in the central vertical plane of the machine, if one steering wheel strikes a rock or other obstruction, it will readily ride over the same without disturbing the equilibrium of the entire machine and as soon as the obstruction has been passed, the wheels will assume their normal position. The universal joints 45 and 47 permit the connecting bar 43 and the wheel spindles to follow the vertical oscillation of the wheels without distorting or putting additional strain upon the crank 48 or other parts of the steering mechanism and the construction of the front axle or truss shown and described enables the same to very effectually resist torsional or lateral strains. The arrangement of the hangers 27 and 29 brings the cultivators or other implements between the side bars of the main frame so that they will not be caused to work in the ground upon which the wheels are traveling and will also be firmly supported so that they will not tend to twist the machine out of the path which it is desired to follow. The parts of the machine are very compactly arranged and are fitted together in such a manner as to provide maximum strength with minimum weight.

Having thus described my invention, what I claim and desire to secure by Letters Patent is:

1. In a machine for the purpose set forth, the combination of a main frame, a transverse support secured within said main frame, an arched axle pivotally hung on said support in the longitudinal vertical plane of the main frame and extending under the sides of the main frame, vertical spindles journaled upon the ends of said arched axle, steering wheels carried by said spindles, and means connected with the upper ends of said spindles to rotate the same.

2. In a machine for the purpose set forth, the combination of a main frame, a transverse support secured to said main frame, brackets rising from the main frame over said support, a vertical steering shaft journaled in said brackets and in a member of the main frame, a segmental gear on said shaft, a worm shaft meshing with the segmental gear, a steering rod connecting with the said worm shaft, a crank extending forwardly from said steering shaft, steering axles having vertical spindles, a support for said steering axles mounted upon the main frame for vertical oscillation, cranks projecting forwardly from said vertical spindles, a connecting rod between said cranks, a pitman connected with the crank projecting from the steering shaft, and connections between said pitman and the connecting rod including a universal joint.

In testimony whereof I affix my signature.

ADELBERT TIFFANY. [L. s.]

Copies of this patent may be obtained for five cents each, by addressing the "Commissioner of Patents, Washington, D. C."